United States Patent
Neuhaus

(10) Patent No.: US 8,153,998 B2
(45) Date of Patent: Apr. 10, 2012

(54) TEMPERATURE RADIATOR

(75) Inventor: Dietmar Neuhaus, Duesseldorf (DE)

(73) Assignee: Deutsches Zentrum für Luft- und Raumfahrt e.V., Cologne (DE)

( * ) Notice: Subject to any disclaimer, the term of this patent is extended or adjusted under 35 U.S.C. 154(b) by 1472 days.

(21) Appl. No.: 11/699,977

(22) Filed: Jan. 30, 2007

(65) Prior Publication Data

US 2007/0193727 A1    Aug. 23, 2007

(30) Foreign Application Priority Data

Feb. 21, 2006 (DE) .................. 10 2006 008 409

(51) Int. Cl.
*H05B 6/00* (2006.01)

(52) U.S. Cl. ............. 250/504 R; 250/493.1; 250/495.1; 219/553; 392/407; 392/432; 392/435

(58) Field of Classification Search .............. 250/493.1, 250/495.1, 504 R, 504 H; 273/348.1; 219/553; 392/407, 432, 435

See application file for complete search history.

(56) References Cited

U.S. PATENT DOCUMENTS

| | | | | |
|---|---|---|---|---|
| 3,138,697 A * | 6/1964 | Banca et al. ................. | 392/407 |
| 3,660,659 A | 5/1972 | Eisenman et al. | |
| 4,279,599 A * | 7/1981 | Marshall et al. ........... | 273/348.1 |
| 4,572,958 A * | 2/1986 | Durand et al. ............. | 250/495.1 |
| 4,789,788 A * | 12/1988 | Cox .......................... | 250/504 R |
| 5,408,101 A * | 4/1995 | Wong ........................ | 250/493.1 |
| 5,838,014 A * | 11/1998 | Cabib et al. ............... | 250/504 R |
| 5,838,015 A * | 11/1998 | Burdick et al. ........... | 250/504 R |
| 5,864,144 A * | 1/1999 | Laine ........................ | 250/504 R |
| 6,455,851 B1 * | 9/2002 | Lord et al. ................. | 250/338.5 |
| 6,713,774 B2 * | 3/2004 | DeSteese et al. .......... | 250/505.1 |
| 7,512,161 B2 * | 3/2009 | Dadson et al. .................. | 372/24 |
| 2011/0127450 A1 * | 6/2011 | Holber et al. ............. | 250/504 R |

FOREIGN PATENT DOCUMENTS

| | | |
|---|---|---|
| DE | 10342800 | 4/2005 |
| EP | 0708316 | 4/1996 |
| WO | 94/01873 | 1/1994 |
| WO | 2005/036140 | 4/2005 |

OTHER PUBLICATIONS

Revue D'Optique.
Thin-film electrooptical property study for FIR absolute radiometers.
European search report.

* cited by examiner

*Primary Examiner* — Jack Berman
(74) *Attorney, Agent, or Firm* — Fulwider Patton LLP

(57) ABSTRACT

A temperature radiator, which comprises an emission surface emitting a thermal radiation, is provided with a radiation converter to which a laser beam is irradiated. The radiation converter comprises a micro-structured receiving surface and a micro-structured emission surface. These two surfaces are surrounded by a smooth boundary. The laser radiation is absorbed at the receiving surface and converted into thermal radiation which is emitted in a uniformly distributed manner at the emission surface.

18 Claims, 1 Drawing Sheet

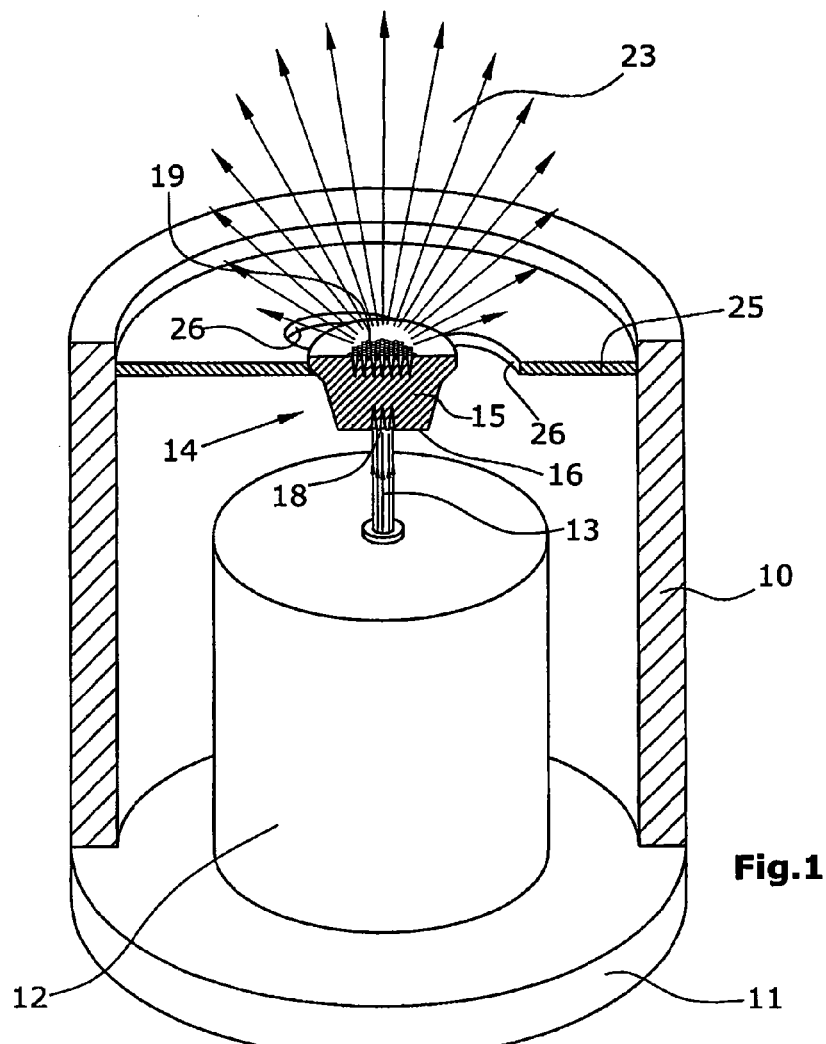
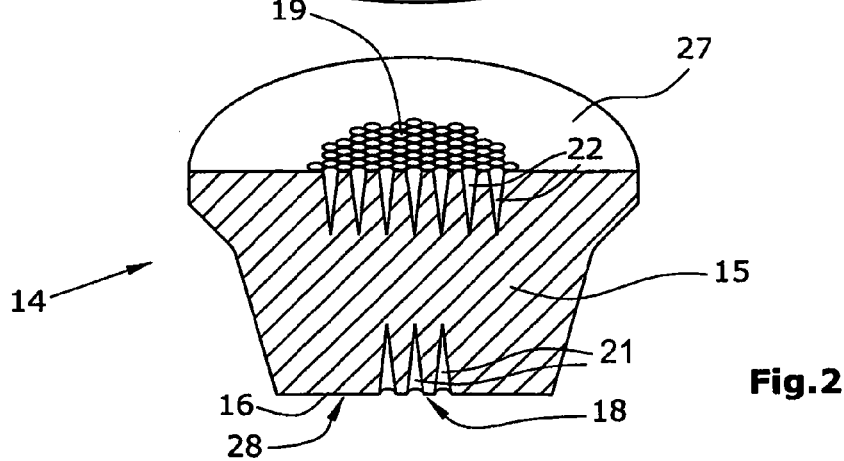

TEMPERATURE RADIATOR

BACKGROUND OF THE INVENTION

The present invention relates to a temperature radiator having a high specific radiation power, in particular for use in miniaturized optical systems.

For a number of optical instruments, such as spectrometers, new fields of application would be opened up if the instruments can be made considerably smaller. For this purpose, optical components, such as temperature radiators, which are used in absorption spectrometers, must be made smaller. Temperature radiators are panel radiators, i.e. a reduction of the dimensions of the radiator results in a considerable reduction of the radiation power with ad-verse effects on the characteristics of the optical instrument. In the case of an absorption spectrometer, the reduced radiation power would affect the resolution and the sensitivity of the spectrometer. An increase in the specific radiation power of the temperature radiator is a possible way to meet the adverse effects of the reduction in size. It is known that the specific radiation power of a temperature radiator can be increased by raising the temperature of the radiator; this has however the drawback that an increased temperature results in higher energy losses of the radiator due to heat conduction. In particular in small optical systems the energy input by heat conduction into the environment of the temperature radiator poses a problem. In the known miniaturized temperature radiators an electrical resistance heating is used, which is however disadvantageous in that electrical conductors are good heat conductors rendering thermal insulation difficult.

SUMMARY OF THE INVENTION

It is an object of the present invention to provide a miniaturized temperature radiator having a high specific radiation power.

According to the invention, the temperature radiator comprises a radiation converter having a radiation-absorbing receiving surface to which a laser beam is irradiated, and an emission surface. The radiation converter is com-posed of a small body which absorbs the laser radiation and is thus strongly heated up. The radiation converter is heated by the laser radiation for the purpose of acting as a temperature radiator. The laser radiation, which normally is an electro-magnetic radiation in the range of infrared light, heats the radiation converter such that the latter acts as a temperature radiator, wherein the thermal radiation comprises more wavelengths than the absorbed radiation.

In a particularly advantageous embodiment, the small body of the radiation converter, which can also be referred to as absorber/emitter, is made of a high temperature-resistant material. A suitable material is silicon carbide, for example.

According to a preferred embodiment of the present invention, the receiving surface and/or the emission surface of the radiation converter is defined by a limited surface area with an increased porosity as compared with its environment. By micro-structuring, the absorption characteristics and emission characteristics, respectively, of the radiation converter are appropriately changed at least in portions of its surface. By micro-structuring the surface, the locations involved attain the absorption characteristics and emission characteristics, respectively, of a black radiator or have characteristics similar to those of a black radiator. The absorption characteristics of a black radiator are favor-able since they allow the laser radiation to be absorbed in an optimum manner. The emission characteristics of a black body are equally optimum.

Advantageously, the absorption characteristics and emission characteristics, respectively, of the radiation converter are changed, in portions of its surface, by micro-structuring, i.e. fine changes in the geometry of the surface, since this process, in addition to the intrinsic characteristics of the material of the radiation converter, determines its absorption and emission characteristics. Thereby, a leeway in configuration of the temperature radiator is opened up. Here, the fact that the emission and absorption characteristics of a body also depend on the body's geometry is made use of (André Goffé, Revue d'Optique, No. 1-3, January-March 1945, page 1). By micro-structuring portions of the surface of the radiation converter, the absorption characteristics can be optimized at the location where the laser beam impinges upon the radiation converter. The same holds true for the emission characteristics which can be specifically changed by micro-structuring at a given location on the surface of the radiation converter. Here, it is advantageous when the intrinsic emission capacity of the material of the radiation converter, i.e. the emission capacity of a polished surface made of this material, is as low as possible, since an optimum radiation emission then emanates only from the micro-structured portions of the surface. Thus, the radiation losses can be kept at a low level. This allows miniaturized temperature radiators with a high specific radiation power to be obtained for small optical instruments.

BRIEF DESCRIPTION OF THE DRAWINGS

A preferred embodiment of the invention will now be described in greater detail with reference to the drawings in which:

FIG. 1 shows a perspective fragmentary sectional view of the temperature radiator; and FIG. 2 shows an enlarged view of the body of the radiation converter.

DETAILED DESCRIPTION OF THE PREFERRED EMBODIMENTS

FIG. 1 shows an overall configuration of the radiation converter. The radiation converter comprises a tubular housing 10 terminated by a lower end wall 11 which serves as a base plate for a laser 12. The laser 12 emits a laser beam 13 along the axis of the housing 10. In the path of the laser beam 13 the radiation converter 14 is suspended. The radiation converter is composed of a generally truncated body made from a high temperature-resistant material, such as silicon carbide. Silicon carbide further offers a high thermal shock resistance which allows the radiation converter to be rapidly heated up and cooled down. This is advantageous in some applications in the field of spectroscopy where a temperature radiator with a pulsating radiation power is required.

The body 15 comprises a smaller lower end wall 16 and a larger upper end wall 17. The diameter of the lower end wall is 0.8586 mm, for example, and that of the upper end wall is 1.4 mm, for example. That portion of the lower end wall 16 upon which the laser beam 13 impinges defines the receiving surface 18. A sub-portion of the upper end wall 17 defines the emission surface 19. The receiving surface 18 has a diameter of 0.05 mm, for example, and the emission surface 19 has a diameter of 0.25 mm, for example.

The receiving surface 18 and the emission surface 19 are each provided with a porous microstructure. In the present case, this porous microstructure is defined by conical bores 21 and 22, respectively (FIG. 2) which vertically ex-tend from the respective end wall into the body 15. In the illustrated embodiment, an individual bore has a maximum diameter of approximately 50 μm and a depth of approximately 0.22 mm. The conical bores 21,22 have been selected since they are easy to produce by laser processing. By micro-structuring the receiving surface 18 and the emission surface 19, the emission and absorption capacities are increased, as described in the publication of André Gouffé cited above. The laser beam 13 is targeted to the receiving surface 18 and is limited to this surface.

Boundaries 27 and 28 surrounding the receiving surface 18 and the emission surface 19 are smooth and preferably polished like a lateral peripheral surface of the body 15. The emission surface 19 comprising the numerous conical bores acts as an emitter of a thermal radiation 23 having an emission coefficient increased by micro-structuring.

The body 15 is mounted in a holding fixture 25 which is attached in the tubular housing 10 in a spaced relationship to the lower end wall 11. The holding fixture 25 is composed of a disk made from a material with poor heat conductivity. A particularly advantageous material is a ceramic material, in particular zirconium oxide. The holding fixture 25 comprises a center hole in which the body 15 is inserted. At the edge of the center hole recesses 26 are provided. The webs between the recesses 26 define a three-point holding fixture which contacts the body 15 only at three locations, whereby the desired poor heat transmission to the holding fixture 25 is attained.

The laser 12 is provided in particular with a light source in the form of a laser diode of small dimensions.

The emission surface 19 acts as a panel radiator with a radiation density uniformly distributed over the overall surface. Due to the polished boundaries surrounding the receiving surface and the emission surface, these surfaces have only a very poor emitting capacity as compared with the structured surfaces. Thus, a high radiation concentration occurs at the emission surface 19.

Although the invention has been described and illustrated with reference to a specific illustrative embodiment thereof, it is not intended that the invention be limited to this illustrative embodiment. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

I claim:

1. A temperature radiator, in particular for use in miniaturized optical systems, wherein a radiation converter (14) comprises a radiation-absorbing receiving surface (18) to which a laser beam (13) is irradiated, and an emission surface (19), wherein the radiation converter (14) further comprises a generally truncated body (15), the receiving surface (18) is provided at the small end wall (16) and the emission surface is provided at the larger surface (17).

2. The temperature radiator according to claim 1, wherein the radiation converter (14) is made from a ceramic material.

3. The temperature radiator according to claim 1, wherein the receiving surface is a limited surface area with an increased porosity as compared with its environment.

4. The temperature radiator according to claim 3, wherein a boundary of the receiving surface comprises a polished surface.

5. The temperature radiator according to claim 1, wherein the receiving surface is provided with numerous bores.

6. The temperature radiator according to claim 5, wherein the bores are conical or truncated.

7. The temperature radiator according to claim 5, wherein the bores are arranged in a close-packed manner at the surface of the radiation converter.

8. The temperature radiator according to claim 1, wherein the emission surface is a limited surface area with an increased porosity as compared with its environment.

9. The temperature sensor according to claim 8, wherein a boundary of the emission surface comprises a polished surface.

10. The temperature radiator according to claim 1, wherein the emission surface is provided with numerous bores.

11. The temperature radiator according to claim 10, wherein the bores are conical or truncated.

12. The temperature radiator according to claim 10, wherein the bores are arranged in a close-packed manner at the surface of the radiation converter.

13. The temperature radiator according to claim 1, wherein the radiation converter is composed of a body which is held by a holding fixture with poor heat conductivity.

14. The temperature radiator according to claim 13, wherein the holding fixture is a three-point holding fixture which contacts the body only at three locations.

15. The temperature radiator according to claim 1, wherein a tubular housing is provided which comprises, on an end wall, a laser emitting in parallel to the housing axis, and which supports a holding fixture holding the radiation converter.

16. The temperature radiator according to claim 1, wherein the material of the radiation converter has a low intrinsic emission capacity of a maximum of 1%.

17. A temperature radiator, in particular for use in miniaturized optical systems, wherein a radiation converter (14) comprises a radiation-absorbing receiving surface (18) which is provided with numerous conical or truncated bores, to which a laser beam (13) is irradiated, and an emission surface (19).

18. A temperature radiator, in particular for use in miniaturized optical systems, wherein a radiation converter (14) comprises a radiation-absorbing receiving surface (18) to which a laser beam (13) is irradiated, and an emission surface (19) which is provided with numerous conical or truncated bores.

* * * * *